United States Patent [19]
Keeler

[11] 4,172,064
[45] Oct. 23, 1979

[54] PRINTING INK COPOLYMERS

[75] Inventor: Joseph M. Keeler, New York, N.Y.

[73] Assignee: Claremont Polychemical Corporation, Old Bethpage, N.Y.

[21] Appl. No.: 829,116

[22] Filed: Aug. 30, 1977

[51] Int. Cl.$^2$ .............................................. C08L 31/00
[52] U.S. Cl. .................... 260/29.6 TA; 260/29.6 AN; 260/20.6 E; 260/29.6 M
[58] Field of Search ................... 260/29.6 AN, 29.6 E, 260/29.6 ME, 29.6 TA

[56] References Cited

U.S. PATENT DOCUMENTS

| | | | |
|---|---|---|---|
| 2,753,318 | 7/1956 | Maeder | 260/29.6 TA |
| 2,767,153 | 10/1956 | Sutton | 260/29.6 TA |
| 2,787,561 | 4/1957 | Sanders | 260/29.6 TA |
| 2,787,603 | 4/1957 | Sanders | 260/19.6 AN |
| 3,532,654 | 10/1970 | Finn et al. | 260/28.5 R |
| 3,615,791 | 10/1971 | Thomas et al. | 260/29.6 AN |
| 3,640,935 | 2/1972 | Abriss | 260/29.6 E |
| 3,903,034 | 9/1975 | Zabiak et al. | 260/20.6 E |
| 4,005,038 | 1/1977 | Minkoff | 260/29.6 ME |
| 4,048,379 | 9/1977 | Jidai et al. | 260/29.6 AN |

*Primary Examiner*—Melvyn I. Marquis
*Attorney, Agent, or Firm*—E. Janet Berry; Lawrence Rosen

[57] ABSTRACT

An aqueous copolymer coating system, adapted for forming abrasion-resistant coatings for application to wood, plastic, metal, paper and other substrates using either printing or coating processes; the copolymer employed in the coating system includes the following:

(a) a four component (monomer) copolymer comprising (1) an alkyl methacrylate, (2) an alkyl acrylate, (3) unsaturated nitrile, and (4) unsaturated organic acid, said copolymer adapted for use in an aqueous system;

(b) at least one coalescing agnet for the ether-alcohol type;

(c) at least one surfactant agent which may be either of the substituted polyether non-ionic type or one of a group of selected anionic agents; and (d) one or more additives as may be necessary to impart color, control foam, and prevent mildew and/or fungus attack.

29 Claims, No Drawings

PRINTING INK COPOLYMERS

BACKGROUND OF THE INVENTION

The use of water-based coatings by industry is becoming increasingly desirable, since applications in which water-based coatings are employed minimize the emission of hydrocarbon or solvent materials during drying and other processes. This has numerous advantages, both in minimizing the economic penalty of lost materials and also in ecological (air and water pollution) advantages. At the present time, in many jurisdictions, the emission of volatile organic products is limited by law, so that users of such solvents are faced with the cost of installation of recovery equipment or of incinerator devices. The use of solvents based on hydrocarbons may become an economic luxury that cannot be afforded in the future. In addition, the potential fire hazard of flammable solvent systems is well known to industry.

Although water-based coatings have substantial advantages, the practical difficulties of forming good coatings from water-borne systems are not easily overcome. Since most organic polymer systems that would be expected to be candidates to form attractive coatings are not soluble in water, the organic phase must be present either as a latex or as a colloidal macromolecular stabilized suspension. The polymer itself must demonstrate superior film characteristics after the solvent has evaporated. To do this the film formation process must proceed through an evaporative process depositing the organic polymer as well as forming a coherent film by the coalescence of the discrete polymer particles. Similarly, the polymer itself must be capable of film coalescense during the evaporation, but once formed, must be tough and resistant to both detergents and solvents. Finally, the polymer system chosen should be capable of being made industrially, since not every polymer precursor can be combined with others in proportions that will give the physical properties that are desired in the resulting polymer system.

In the past, if a hard tough polymer film based upon an acrylic ester polymer was desired, the normal procedure was to proceed by way of the thermosetting acrylic route. In this approach, a reactive monomer system was copolymerized to form an acrylic copolymer, as a latex. This material was then mixed with a water-soluble curing agent, so that after the initial film drying process, a second-stage baking step at elevated temperature would be conducted to give the ultimate physical properties to the system. This two-stage process was time-consuming, expensive as to both energy and equipment, and could not be adapted for a substrate which could not endure the thermal cure. For this reason, the materials of the present invention, which give good physical properties without requiring an extended thermal cure represent an advance in the state of the art.

In the development of an acrylate type polymer for practical use as a coating as well as one capable of being formed by the usual industrial processes of emulsion or suspension polymerization, the use of a combination of monomeric components to achieve an optimum compromise in the useful properties of the resulting polymeric film is well-known. In general modification of a standard acrylate polymer by copolymerization to improve a given characteristic will result in a corresponding loss in some other desirable property. For example, increasing the proportion of an alkyl ester, such as hexyl or octyl acrylate in the ethyl acrylate will improve film formation coalescence but its toughness will be decreased, as will resistance to organic solvents. Similarly, as other monomers are added to the system, changes, both for better and worse and frequently unpredictable will occur. For this reason, arriving at a composition and level of monomer content to obtain a practical product is not a result achieved only by theoretical considerations.

In order to form a coherent film on a substrate from a latex, a coalescing agent is usually incorporated. These materials are usually ether-alcohol compounds with typical materials being methyl, ethyl or butyl CELLOSOLVE, butyl CARBINOL, butyl carbinol acetate and the like. The function of the coalescing agent is to soften and reduce the viscosity of the non-aqueous phase so that the individual particles fuse together to form the required continuous film as the aqueous phase disappears during drying. The coalescing agent may be slowly volatile and will thus leave the film after it has formed. Since the interaction between the coalescing agent and the polymer phase must occur during the drying process and at the polymer-water and polymer-polymer interfaces, the optimum coalescent agent tends to be a specific component for a given system. The specific coalescent agent is chosen to be one which functions best with the specific copolymer system being used to form the coherent film.

Because the aqueous coating compositions are used to coat substrates that may or may not be easily wet by water, a surfactant system should be incorporated. The surfactant must be compatible with any surfactant system that may already be present at the polymer surface, being present both as emulsifier and stabilizer from the polymerization process. Similarly, the surfactants must not interfere with the coalescing agent in its fusion role. The surfactant lowers the surface tension of the aqueous system so that the coating formulation wets both the printing plate or device, as well as the substrate onto which the coating is being applied. Under these conditions the printing or coating can be applied by conventional equipment already in use in the trade. Since these printing devices are often rotating cylinders, which dip into the aqueous material while rotating at high speed, the surfactants chosen must be effective but must not produce excessive foam either at the supply fountain, or at the surface as the printing or coating transfer of material occurs.

In a practical coating system, there are also employed several auxiliary ingredients so-called because they have only minor effects on the physical properties intrinsic to the polymeric coating. These added materials are vital to a useful product—they include pigments to give the coating color and opacity, anti-foam agents to reduce foaming, anti-freeze components to give the system freeze-thaw resistance, and fungicides and mildewcides to minimize degradation. There may also be present ultra-violet light stabilizers and anti-oxidants, and while all of these components would be most important and necessary for a useful product and must be chosen so that they would not interact either with the basic polymer system or with each other, they have minor effect on the intrinsic properties of the coating system itself.

It has now been discovered that superior film-forming compositions which are tough and durable films at ambient temperatures can be formulated using certain selected mixtures containing at least one component from each of the following three groups:
  (1) acrylate-methacrylate copolymers which are present as aqueous dispersions;
  (2) coalescing agents to promote film formation during drying; and
  (3) surfactants to assist the wetting of substrate and printing or coating devices which are used in the water-based coating systems.

The compositions of the invention are compositions of matter which are capable of forming coating films having superior properties when coated on a substrate. The specific areas of invention are believed to include at least the three categories below:
  (1) The copolymers, formed by free radical copolymerization of several monomeric materials in combination—the copolymers so formed having unique properties in its performance. Among these unique properties are film forming capability at temperatures less than 80° C. which makes them useful under drying conditions practical with water-based systems; satisfactory self-bonding film forming properties such that the resulting films have abrasion-resistance to physical abrasion both when they are dry and when exposed to either organic solvents or commonly used aqueous detergent systems; good adhesion properties for substrates onto which they would ordinarily be printed or coated.
  (2) The dispersions, in aqueous suspension, of the polymer backbone system so prepared.
  (3) The formulated aqueous coating compositions formed by the dispersion of the polymer, in combination with coalescing agents, co-solvents, surfactants and auxiliary materials, including pigments that are capable of forming an abrasion-resistant and detergent resistant coatings on non-porous substrates at ambient temperatures, i.e., no high temperature thermal curing required.

The various processes which can be employed for preparing these coating systems will be described in greater detail for each of the formulation components.

The polymeric components which, after copolymerization, form the dispersions of the invention are critical combinations for the coating system, since the ratio of the material used must be selected such that the resulting copolymer material will be capable of forming coherent plasticized films at ambient temperatures, yet have a level of polar-substitution such that a tough and self-reinforcing film will be formed.

In more specific embodiments, the copolymers consist of a combination of alkyl ester of the methacrylate and acrylate type as the major components, while polar, but non-ionic components are provided by olefinic monomers, such as unsaturated nitriles and carboxylic acids. Several combinations of these components provide the balance of properties that give the desired final product and the advantageous results of the invention.

In selecting the monomers which are necessary for a superior coating, certain interacting factors have been considered. Of prime importance is the requirement that the resulting polymer have a glass-transition-temperature and related minimum-film-formation temperature of less than 80° C. in order that a good film is formed at ambient temperature. The monomers used must be selected such that both their light and oxidative stability are satisfactory. They must form a polymer that is hard, but flexible.

The polymer systems which exhibit such optimum behavior for use in this invention are as follows:

(1) The basic monomer components are mixtures of aliphatic esters of methacrylic and acrylic acid. The exact percentage and type of monomer employed can be varied and the exact choice depends at least in part upon the other monomers present in the system.

(2) The polar, but non-ionic components, are mixtures of alpha-beta unsaturated carboxylic acids and nitriles, wherein a molar excess of the nitrile components is present over the carboxylic acid components.

Acrylic and methacrylic esters that can be used in the invention compositions include the derivatives of the aliphatic alcohols, having 1 to 20 carbon atoms such as methyl, ethyl, n-propyl, iso-propyl, n-butyl, iso-butyl, n-hexyl, 2-ethylhexyl, isocecyl, n-lauryl, and stearyl.

The olefinic nitriles that can be utilized include the various unsaturated, aliphatic nitriles having from 3 to 6 carbon atoms such as acrylonitrile, methacrylonitrile, maleonitrile, and fumaronitrile.

Carboxylic acid monomers that can be used include those having from 3 to 20 carbon atoms such as acrylic acid, methacrylic acid, itaconic acid, maleic acid and its monoalkyl esters, and fumaric acid. The combinations and ratio of monomers in the copolymer that are effective are generally selected from the ranges set forth below.

The methacrylic and acrylic ester component combination preferably comprises from about 50 to 80 percent by weight of the total copolymer composition. The actual ratio and distribution of the monomers and the specific proportions of the various alkyl substituents can be varied but are to be chosen such that the glass transition temperature of the copolymer and the related minimum film formation temperature is not higher than the expected drying temperature.

The nitrile component and the carboxylic component together preferably comprises 20–50 percent by weight of the total copolymer with the nitrile component preferably used in molar excess over the carboxyl-containing component. In one preferred embodiment, the carboxyl monomer is incorporated in about 2–15 percent, and the nitrile component is used in about 10–40 percent by weight.

The coalescent system which assists the formation of a coherent linear film as the water dispersion dries on the substrate is also a critical component of the coating system. Superior coalescent agents for this polymer system are the linear mono alkyl esters of diethylene glycol, as exemplified by specific agents, such as the ethyl, n-propyl, n-butyl and n-hexyl ethers of diethylene glycol about 5–10 percent of the coalescent agent is used based on the total system in which polymer solids would be present at the level of about 30–40 percent. Coalescent agents which can be used in aqueous latex coating include methyl, ethyl or butyl cellosolve, butyl CELLOSOLVE acetate, butyl hexyl CELLOSOLVE and butyl hexyl CARBINOL acetate. Specialized materials such as tributoxyethyl phosphate and other specific proprietary materials can also be employed. Specialized materials such as tributoxyethyl phosphate and other specific proprietary coalescing agents, such as 1-(2,2,4-trimethyl)-1,3-pentanediol-isobutyrate are also effective.

Thd exact choice of material as well as the level of coalescent agent used is often quite critical in a water-based coating formulation. Excess amounts of a coalescent agent tend to soften the film because of the powerful plasticizing action. Low volatility leaves residual material in the firm for too long a time, resulting in a slow build-up of the physical properties to the desired final level. Too much residual coalescent agent lowers scrubbability and solvent resistance. On the other hand, insufficient material hinders the formation of the coherent well-coalesced film necessary to useful product.

The preferred surfactant adduct for use with the polymer system and preferred coalescent agents is a mixture of hydroxyl-terminated polyethylene oxide adducts of n-alkyl alcohols and 4-substituted n-alkyl phenols used in approximately equimolar amounts at a total percent of about 0.5 to 4.0. The surfactants of this type are commonly available commercially.

However, it is to be noted that the combination of both an alkyl-substituted aromatic phenol and an aliphatic alcohol gives superior performance to that of either material used singly. It is believed possible that specific bonding at the polar substituents of the copolymer may be responsible for this effect.

The surfactants which have proven to be effective are the polyethylene oxide adducts of the n-alkyl alcohols (where the carbon chain used was between 4 and 12 carbons) and where between 4 and 40 ethylene oxide groups were added. While for the alkyl phenol similar carbon attachment and ethylene oxide addition levels were present.

Typical materials of this type include some Triton X non-ionic materials, the Surfonic N series materials, the Igepal series of products or the Tergitol materials.

In the formulation of a practical coating it may be necessary to include additional materials in the formulation. These would include without limitation such materials as:

(1) a water-dispersed or dispersable pigment in which surfactant pigment dispersion aids, and any adjuncts to modify the viscosity should be chosen to be compatible with the three essential components already present in the aqueous binder system;
(2) fungicides and mildewcides to prevent degradation during storage of the water-based material;
(3) viscosity adjustment aids; and
(4) freeze-thaw stabilizers.

In the case of all these additives, if properly chosen, they will have minimal effect on the properties of the final film. In every instance, they must be chosen so as not to have a deleterious effect on the final film product.

A useful coating system is usually evaluated on the basis of several criteria, whose relative importance varies with the substrate to which the system is applied and the intended service use. Whatever the end-use is to be, there are minimum requirements for each of these properties that must be met in order for the coating to be useful. The usual criteria for use are exterior durability including resistance to light or oxidative-induced color change; hardness; flexibility; stain resistance to the common aqueous and oil-based everyday stains such as mustard, catsup, lipstick, and ball-point pen ink; scrubbability when the common staining materials are removed with the usual soap, detergent or household cleansers; mar resistance; water, hydrocarbon solvent, alcohol or grease resistance; and adhesion to the substrates to which it is applied.

In the acrylic copolymer systems, the functional group substituents on the monomers are chosen such that the polymer glass transition temperature which is closely related to the minimum film forming temperature of the dispersed system remains in the useful temperature range.

If the polymer system is composed in part of a potentially reactive monomer that is capable of undergoing self-reaction, either by itself, or with some other component present in the formulation then after the coherent surface film has formed, a third factor affecting the physical properties of the final film will have to be considered.

The physical properties of the coating is frequently improved by the incorporation of polyfunctional materials that form primary valence bonds with some of the residual carboxylic acid groups of the coating. Materials which can be used for this purpose include di- and tri-functional inorganic salts, such as the metallic oxides, epoxide materials, and the various agents reported to be useful as curing agents for acrylate rubber products and other carboxylic elastomers.

GENERAL EXAMPLE

The novel four component polymers of this invention can generally be prepared by conventional polymerization procedures.

The standard procedures and methods of emulsion polymerization, as described in greater detail in standard references, such as the following, can be employed.

Standard references for polymer preparation include:
1. *Emulsion Polymerization* by D. C. Blakesly—Halstead Press, New York, (1976).
2. *Principles of Polymerization* by George Odian—McGraw Hill Book Co., New York (1970).
3. *Monomeric Acrylic Esters* by E. H. Riddle, Chapter IV, Reinhold Publishing Co., New York (1954).
4. *Emulsion Polymerization of Acrylic Monomers* Pamphlet SP-154 (1966) Rohm & Haas Co., Philadelphia, Pa.

Using conventional emulsion polymerization techniques, one-third of a mixture consisting of acrylonitrile (140), methyl acrylate (292.6), methyl methacrylate (144.1) and methacrylic acid (67) (all parts by weight) was added to deionized water (449.6) containing an anionic surfactant, the organic phosphate (ester-free) acid (GAFAC RE-610 of GAF Corp. which is an anionic surfactant having a complex organic phosphate ester structure, an acid number of 62-72 when titrated to the pH 5.5 titration point) 11.6 parts and 0.5 part sodium bicarbonate in the reaction kettle. After 15 minutes of nitrogen sparge, a four percent aqueous solution of ammoniac persulfate (24.2 parts) followed by a ten percent solution of sodium metabisulfite (10 parts) was added. As the reaction exotherm became apparent, the remaining two-thirds of the monomer mixture was added over a 1½ to 2 hour period, while maintaining a reaction temperature of 30°-60° C. After the addition of monomer, and dissipation of the reaction exotherm, the system was heated to 90° C. for one hour, then cooled to room temperature.

The product was adjusted to 7.5-8.0 pH using 28% ammonia hydroxide, and then diluted with water to a solid level of 34 percent.

The polymer of this invention and the coating compositions prepared therefrom are described and have been evaluated primarily as inks and coatings for use on plastic substrates derived from polyvinyl chloride and its copolymers; however the applications and uses of this coating material are not limited to this particular substrate or its end uses. Many alternate uses and substrates useful for application of this coating composition include but are not limited to, the following:

1. Water-based printing inks for use on polyvinyl chloride and related copolymers.
2. Water-based topcoats for use over previously applied solvent-based coatings on polyvinyl chloride and its copolymers.
3. Water-based printing material for printing on fabrics, formed from natural or synthetic materials.
4. Water-based material for coating individual cloth fibers.
5. Water-based material for coating fiber-glass cloth and fibers.
6. Water-based material for printing or coating leather.
7. Water-based material for printing and coating steel, brass, bronze, aluminum.
8. Water-based material for metallic-pigment inks and coatings.
9. Water-based printing ink and coating for use as topcoat over solvent-based inks or paper or cardboard.
10. Water-based printing and coating for use on inorganic compositions such as shingles, wallboards, plasterboard, floor tile.
11. Thermoplastic transfer coatings for transfer to cloth, paper, etc. by thermal release.
12. A binder/adhesive for non-woven fabrics.
13. Laminating coating for bonding plastic-to-plastic or foam-to-plastic for solvent-sensitive materials.
14. As a dispersion-grinding vehicle for the dispersion of pigments in aqueous systems.
15. A potential starting material for electrodeposition when used in an alkaline medium so that the carboxyl component is in the carboxylate ion form.
16. A binder for clay and filler in paper coating
17. An upholstery backing finish.
18. A latex vehicle for water-based paints.

Although the various formulations of this invention have been specifically for application by roll coating printing type processes, the use of these materials is not limited to this specific type of application method. In addition to the methods used in web-coating of film type substrates, other methods, such as but not limited to the following can be employed; squeeze roll coater, kiss coater, dip roll coater, transfer roll coater, gravure roll coater, reverse Roll Coater, calender coating, extrusion coating, curtain coater, knife coater, rod coater, spray coater, air doctor coater, flexible blade coater, brush coater, vacuum coating, electrostatic coating, and bead coater.

All of these methods are described in greater detail in Chapter II of "The Science and Technology of Polymer Films", Vol. I, edited by O. J. Sweeting—Interscience Publishers, New York, 1968. The alternate application methods of brushing, dipping, flow coating, curtain coating, air spraying, hydrostatic spraying, electrostatic spraying, and electro-deposition, are also contemplated. These methods are described briefly by E. P. Miller as Chapter 21 of "Applied Polymer Science" edited by J. K. Craver and R. W. Tess published (1975) by the Organic Coatings and Plastics Division of the American Chemical Society, Washington, D.C.

The pH adjustment of both the initial water-dispersion of the polymer as formed and of the formulated and pigmented coating system is a critical factor in preparing the formulated and pigmented coating system and is a critical factor in the formulation of the composition of this invention. The pH of the system should be maintained in the range wherein the carboxylic acid groups of the polymer are essentially all in the unionized carboxylic acid form, that is, roughly below a pH of about 8.5. If the system is brought to a pH point definitely past the neutral point by the addition of alkaline material, an increase in viscosity occurs as the carboxylic acid groups are converted to the corresponding carboxylate groups, and the system approaches a gel-like consistency. At even higher alkalinity levels, changes in the polymer itself may occur because of hydrolysis of the ester or nitrile functional groups, so that re-neutralization does not yield the same polymer as was initially present. In the adjustment of the pH of the system both at the completion of polymerization and during formulation of the coating composition, it is important that the addition of the alkaline agent be conducted by a method that minimizes any high local concentration of the basic material. Because adverse reactions can occur at the carboxylic acids groups with water-soluble divalent or trivalent metallic cations, the use of a demineralized water for all dilutions is advisable as is the avoidance of pigments and fillers that can either dissolve, even slightly, to form polyvalent cations which can crosslink the system prematurely.

The importance of pH control in the final product is critical to the control of the viscosity of the coating formulation, since both viscosity and related rheology control the printing or coating characteristic as well as the pigment dispersion and settling characteristics of the dispersion. The shelf-stability of an aqueous coating dispersion is of equal or greater importance than are the coating characteristics. These characteristics are determined by a combination of effects, all pH related, since the suspension capability is determined both by the viscosity of the system and by specific interactions between the carboxylic acid groups and the nitrile groups of the polymer. At a pH level of 7.5–8.5, the system is primarily in the carboxylic form, yet it is not acidic to that point where specific changes of the pigment surface or of the polymer occur. At pH levels below 7.0 and above pH 8.5, the shelf stability of the system, as evidenced by pigment settling and agglomeration, are sufficiently uncertain to limit the use of the system as a useful product.

The properties of coating formulations can also be enhanced by the incorporation of less-than stoichiometric proportions of reactive crosslinking materials that may also function as adhesion-promoters in some cases. Specific materials that have proved useful for this purpose have included polyfunctional epoxide materials, polyfunctional aziridynyl materials and finely-dispersed or solubilized metallic salts, preferably oxides, in divalent or trivalent oxidation states. Incorporation of these materials results in an improvement in the abrasion-resistance and detergent resistance of the resultant coatings if a delayed time interval, depending upon temperature of post-curing, is allowed before physically testing.

Potential organic curing agents for this enhancement include:
Glycidyl ether of glycerol
Bisphenol A glycidyl ether
Bisphenol A glycidyl ether (ERL-3794)
ERL 3794 contg. 12% butyl glycidyl ether
N,N-diepoxypropyl-P-aminophenyl glycidyl ether
Vinyl cyclohexene dioxide
Triglycidyl ether of trimethylol propane
Epoxidized Polybutadiene (Oxiron 2000)
Bisphenol A glycidyl ether (DER 332)
Epoxy novalak (EPN 1138)
tris[-(2-methyl)-aziridinyl]phosphine oxide (MAPO)
Phenyl bis[1-(2-methyl)-aziridinyl]phosphine oxide Hexa[1-(2-methyl)-aziridinyl]phosphonitrile trimer
2,4,6-Tris[1-(2-ethyl)-aziridinyl]
1,3,5-Triazine
Bis[1-(2-ethyl)-aziridinyl)]benzene-1,3-dicarboxylic acid amide
Tris[1-(2-ethyl)-aziridinyl]benzene 1,3,5-tricarboxylic acid amide
Bis[1-(2-ethyl)-aziridinyl]sebacic acid amide Presented below are specific examples illustrating the invention but it is by no way intended to limit the invention as claimed thereto.

EXAMPLE 1

An aqueous copolymer dispersion having 40 percent resin solids is prepared from the monomeric mixture

| | |
|---|---|
| Ethyl Acrylate | 50% |
| 2-Ethylhexyl Methacrylate | 10% |
| Acrylonitrile | 25% |
| Acrylic Acid | 15% |
| | 100% |

Then one percent n-butyl carbitol (based on resin solids) and one percent each (based on total system) of non-ionic surfactant an alkylphenoxy poly(ethylenexy)ethanol (TRITON X-114), non-ionic surfactant an alkyloxy poly(ethylenexy)ethanol (TERGITOL 15-S-7) are added and the resulting mixture mixed at low shear rates.

This base material, after dilution 1:1 with water and incorporation of a water-dispersed pigment air dries at 80° C. under forced air-circulation to give a coating showing good abrasion resistance and scrub resistance when tested 24 hours after coating.

EXAMPLE 2

An aqueous copolymer dispersion having 40 percent resin solids is prepared from the monomeric mixture

| | |
|---|---|
| n-butyl acrylate | 45% |
| n-lauryl methacrylate | 20% |
| acrylonitrile | 30% |
| acrylic acid | 5% |
| | 100% |

Then n-hexyl carbitol (1 percent on resin solids) and the surfactants of EXAMPLE 1 are added and the resultant mixture mixed at low shear rates.

This base vehicle, after dilution (1:1) with water and the incorporation of water-dispersed pigment will air dry at 80° C. under forced air circulation to form a coating that exhibits good abrasion resistance and scrub-resistance when tested 24 hours after coating.

EXAMPLE 3

An aqueous copolymer dispersion, having 35 percent resin solids is prepared from the monomeric mixture

| | |
|---|---|
| methyl methacrylate | 45% |
| n-butyl acrylate | 15% |
| acrylonitrile | 25% |
| acrylic acid | 15% |
| | 100% | then n-butyl carbitol (1 percent on resin solids) and the non-ionic surfactants of EXAMPLE 1 are added and the resultant mixture mixed at low shear rates.

This base vehicle, after dilution with water (1:1) and the incorporation of water-dispersed pigment, will air-dry at 80° C. under forced air-circulation to form a coating with good abrasion resistance and scrub resistance when tested 24 hours after coating.

EXAMPLE 4

An aqueous copolymer dispersion, at 35 percent resin solids is prepared from the monomeric mixture

| | |
|---|---|
| n-butyl methacrylate | 60% |
| n-butyl acrylate | 5% |
| acrylonitrile | 30% |
| methacrylic acid | 5% |
| | 100% | then
n-butyl carbitol (1 percent based on resin solids)
non-ionic surfactants of EXAMPLE 1.
are added and the resulting mixture mixed at low shear rates.

This base material, after dilution with water (1:1) and the incorporation of water-dispersed pigment will air-dry at 80° C. under forced-air circulation to give a coating that shows good abrasion resistance and scrub resistance on testing 24 hours after coating.

EXAMPLE 5

An aqueous copolymer dispersion, at 40 percent resin solids is prepared from the monomeric mixture

| | |
|---|---|
| methyl methacrylate | 40% |
| n-butyl acrylate | 25% |
| methacrylonitrile | 25% |
| acrylic acid | 10% |
| | 100% | then
Ethyl carbitol (1 percent on resin solids)
non-ionic surfactants of EXAMPLE 1.
are added and mixed at low shear rates.

This base material, after dilution with water (1:1) and the incorporation of water-dispersed pigment will air-dry at 80° C. under forced-air circulation to give a coating that shows good abrasion-resistance and scrub resistance when tested 24 hours after coating.

EXAMPLE 6

An aqueous copolymer dispersion having 35 percent resin solids is prepared form the monomeric mixture

| | |
|---|---|
| n-butyl methacrylate | 40% |
| iso-butyl acrylate | 15% |
| methacrylonitrile | 35% |
| maleic acid | 10% |
| | 100% | then
n-butyl carbitol (1 percent on resin solids)
non-ionic surfactants of Example 1
are added and mixed at low shear rates.

This base material, after dilution (1:1) with water and the incorporation of water-dispersed pigment will air-dry at 80° C. under forced-air circulation to give a coating that shows good abrasion resistance and scrub resistance when tested 24 hours after coating.

EXAMPLE 7

An aqueous copolymer dispersion having 40 percent resin solids is prepared from the monomeric mixture

| methyl methacrylate | 50% |
| 2-ethylhexyl acrylate | 10% |
| acrylonitrile | 30% |
| acrylic acid | 10% |
| | 100% | then
n-hexyl carbitol (1 percent on resin solids)
non-ionic surfactants of EXAMPLE 1
are added and mixed at low shear rates.

This base material, after dilution with water (1:1) and the incorporation of water-dispersed pigment will air-dry at 80° C. under forced-air circulation to give a coating that shows good abrasion resistance and scrub resistance when tested 24 hours after coating.

What is claimed is:

1. A composition of matter comprising an aqueous dispersion of a four component copolymer of:
   (1) an alkyl ester of acrylic acid,
   (2) an alkyl ester of methacrylic acid wherein at least one of the alkyl substituents of the ester components has at least four carbon atoms, and wherein the sum of the carboxylate esters (1) and (2) are from 50 to 80 percent by weight of the copolymer,
   (3) an ethylenically-unsaturated nitrile containing from three to five carbon atoms,
   (4) an ethylenically-unsaturated carboxylic acid, present in from 2 to 15 percent by weight of said copolymer, containing from three and six carbon atoms, and said nitrile component present in an amount greater than the carboxylic acid component on a mole ratio basis,
   (5) a water soluble or water dispersible coalescent agent comprising an ether selected from the group consisting of mono-alkyl ethers of ethylene glycol and their higher molecular weight homologues and
   (6) a mixture of water-dispersible surfactants derived from hydroxyl terminated polyethylene oxide adducts prepared from
      (1) linear aliphatic primary alcohols and
      (2) linear alkyl-substituted phenols,
   the resulting copolymer having a glass-transition temperature and minimum film formation temperature of less than 80° C. and the pH of the aqueous dispersion being below about 8.5, whereby essentially all of the carboxylic acid groups present are in the unionized carboxylic acid form.

2. The composition of claim 1 in which the alkyl ester of acrylic acid is methyl acrylate.
3. The composition of claim 1 in which the alkyl ester of acrylic acid is ethyl acrylate.
4. The composition of claim 1 in which the alkyl ester of acrylic acid is butyl acrylate.
5. The composition of claim 1 in which the alkyl ester of acrylic acid is isobutyl acrylate.
6. The composition of claim 1 in which the alkyl ester of acrylic acid is 2-ethylhexyl acrylate.
7. The composition of claim 1 in which the alkyl ester of methacrylic acid is methyl methacrylate.
8. The composition of claim 1 in which the alkyl ester of methacrylic acid is ethyl methacrylate.
9. The composition of claim 1 in which the alkyl ester of methacrylic acid is butyl methacrylate.
10. The composition of claim 1 in which the alkyl ester of methacrylic acid is isobutyl methacrylate.
11. The composition of claim 1 in which the alkyl ester of methacrylic acid is isodecyl methacrylate.
12. The composition of claim 1 in which the alkyl ester of methacrylic acid is lauryl methacrylate.
13. The composition of claim 1 in which the ethylenically unsaturated nitrile is methacrylonitrile.
14. The composition of claim 1 in which the ethylenically unsaturated nitrile is maleonitrile.
15. The composition of claim 1 in which the ethylenically unsaturated nitrile is fumaronitrile.
16. The composition of matter of claim 1 in which the ethylenically unsaturated carboxylic acid is acrylic acid.
17. The composition of matter of claim 1 in which the ethylenically unsaturated carboxylic acid is methacrylic acid.
18. The composition of matter of claim 1 in which the ethylenically unsaturated carboxylic acid is itaconic acid.
19. The composition of matter of claim 1 in which the ethylenically unsaturated carboxylic acid is maleic acid.
20. The composition of matter of claim 1 in which the ethylenically unsaturated carboxlic acid is a monoalkyl ester of maleic acid.
21. The composition of matter of claim 1 in which the water-dispersible mono-alkyl ether is the ethyl ether of ethylene glycol.
22. The composition of matter of claim 1 in which the water-dispersible mono-alkyl ether is the ethyl ether of diethylene glycol.
23. The composition of matter of claim 1 in which the water-dispersible mono-alkyl ether is the n-propyl ether of ethylene glycol.
24. The composition of matter of claim 1 in which the water-dispersible mono-alkyl ether is the n-propyl ether of diethylene glycol.
25. The composition of matter of claim 1 in which the water-dispersible mono-alkyl ether is the n-butyl ether of ethylene glycol.
26. The composition of matter of claim 1 in which the water-dispersible mono-alkyl ether is the n-butyl ether of diethylene glycol.
27. The composition of matter of claim 1 in which at least one of the surfactants is a hydroxyl-terminated polyethylene oxide adduct of an alcohol selected from the group consisting of n-hexyl, n-octyl, n-decyl containing between 4 and 20 polyethylene oxide units.
28. The composition of matter of claim 1 in which at least one of the surfactants is a hydroxyl-terminated polyethylene oxide adduct of a phenol selected from the group p-octylphenol, p-nonylphenol, p-decylphenol, containing between 4 and 20 polyethylene oxide units.
29. A composition of matter comprising an aqueous dispersion of a four component copolymer of:
   (1) an alkyl ester of acrylic acid,
   (2) an alkyl ester of methacrylic acid wherein at least one of the alkyl groups has at least four carbon atoms and wherein the sum of said two ester components is from 50 to 80 percent by weight,
   (3) an ethylenically-unsaturated nitrile, containing between three and five carbon atoms, said nitrile present in from 10 to 40% by weight of the copolymer, (4) an ethylenically-unsaturated carboxylic acid, present in from 2 to 15 percent by weight of said copolymer, containing from three to six carbon atoms, and said nitrile component present in an amount greater than the carboxylic acid component on a mole ratio basis, the resulting copolymer having a glass transition temperature and minimum film formation temperature of less than 80° C. and the pH of the aqueous dispersion being below about 8.5, whereby essentially all of the carboxylic acid groups present are in the unionized carboxylic acid form.

* * * * *

UNITED STATES PATENT AND TRADEMARK OFFICE
CERTIFICATE OF CORRECTION

PATENT NO. : 4,172,064

DATED : October 23, 1979

INVENTOR(S) : Joseph M. Keeler

It is certified that error appears in the above-identified patent and that said Letters Patent are hereby corrected as shown below:

Col. 2, line 14, change "CARBINOL" to --CARBITOL--.

Col. 4, line 56, change "CARBINOL" to --CARBITOL--.

Signed and Sealed this

Fifteenth Day of July 1980

[SEAL]

Attest:

SIDNEY A. DIAMOND

Attesting Officer

Commissioner of Patents and Trademarks